(No Model.)
G. S. YINGLING, A. L. FLACK & H. T. HELLER.
TACK HAMMER.
No. 298,649. Patented May 13, 1884.
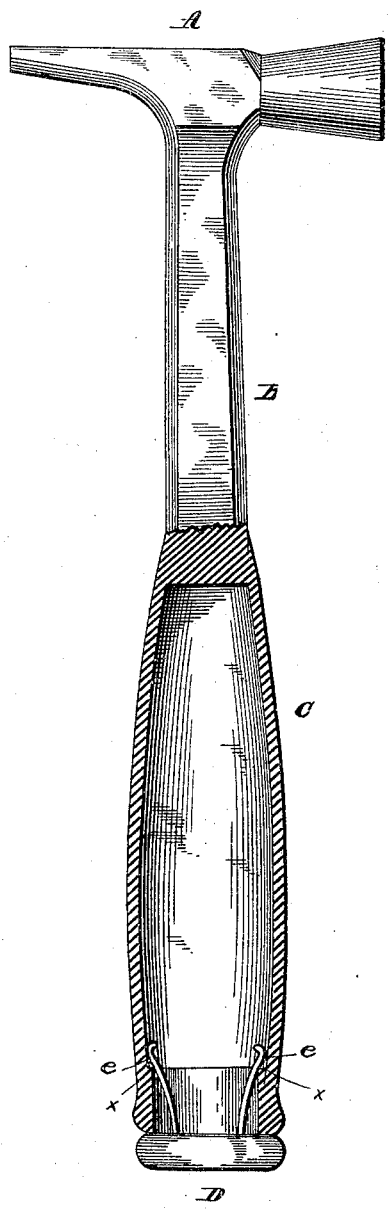
WITNESSES
Edwin L. Yewell.
J. J. M. Carthy.
INVENTORS
Geo. S. Yingling  A. L. Flack &
Henry T. Heller
By C. M. Alexander
Attorney

UNITED STATES PATENT OFFICE.

GEORGE S. YINGLING, ALBERT L. FLACK, AND HENRY T. HELLER, OF TIFFIN, OHIO.

TACK-HAMMER.

SPECIFICATION forming part of Letters Patent No. 298,649, dated May 13, 1884.

Application filed January 24, 1884. (No model.)

*To all whom it may concern:*

Be it known that we, GEORGE S. YINGLING, ALBERT L. FLACK, and HENRY T. HELLER, citizens of the United States, residing at Tiffin, in the county of Seneca and State of Ohio, have invented certain new and useful Improvements in Tack-Hammers, of which the following is a specification, reference being had therein to the accompanying drawing.

Our invention relates to tack-hammers, and the object we have in view is to provide a hammer with a hollow handle to hold the tacks, and to provide this handle with a stopper for its open or outer end, which may readily be removed for the delivery of its contents, while at the same time, when it is connected to the handle, the contents will be retained in its cavity securely prevented from loss.

The figure which accompanies this represents the handle of the hammer in section, showing its cavity.

A represents the hammer proper, and B the shank which connects it to the hollow handle C. The outer end of this handle is provided with a stopper, D, which is removable, and intended to cover the cavity in the handle that holds the tacks. This stopper is provided with two or more spring-prongs, $e\ e$, which enter the cavity of the handle, and, pressing against its sides, hold said stopper in place. The ends of the prongs are turned inward, so that they readily enter the cavity in the handle.

The advantages of this hammer are easily perceived. It is usual when tacks are used to have a separate receptacle to hold them, and from which they are liable to spill and drop at most inconvenient times. With a hammer having a hollow handle the cavity of which is adapted to hold the tacks, and a stopper which can be removed and replaced with safety and dispatch, an article can be furnished to the trade which is needed by housekeepers or by others interested in the use of tacks or brads or small nails. The shoulders $x\ x$ within the cavity of the handle enable the prongs $e\ e$ to hold the stopper D with perfect security.

Having thus fully described our invention, what we claim as new, and desire to secure by Letters Patent, is—

As an article of manufacture, a hammer having its head, shank, and handle all of one piece, the handle being hollow and open at its outer end, and there provided with the shoulders $x\ x$, for retaining the springs $e\ e$ of the stopper, thus forming a receptacle for holding tacks, all being arranged substantially as described.

In testimony whereof we affix our signatures in presence of two witnesses.

GEORGE S. YINGLING.
ALBERT L. FLACK.
HENRY T. HELLER.

Witnesses:
HARRY TAGGART,
THOS. J. KINTZ.